US012810027B2

(12) United States Patent
Kairouz et al.

(10) Patent No.: US 12,810,027 B2
(45) Date of Patent: Nov. 24, 2026

(54) PRIVATE FEDERATED LEARNING WITH REDUCED COMMUNICATION COST

(71) Applicant: Google LLC, Mountain View, CA (US)

(72) Inventors: Peter Kairouz, Seattle, WA (US); Christopher Choquette-Choo, Sunnyvale, CA (US); Sewoong Oh, Seattle, WA (US); Md Enayat Ullah, Baltimore, MD (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 18/424,645

(22) Filed: Jan. 26, 2024

(65) Prior Publication Data

US 2024/0281564 A1 Aug. 22, 2024

Related U.S. Application Data

(60) Provisional application No. 63/481,752, filed on Jan. 26, 2023.

(51) Int. Cl.

*G06F 21/62* (2013.01)
*H03M 7/32* (2006.01)
*H04L 69/04* (2022.01)

(52) U.S. Cl.

CPC ...... *G06F 21/6254* (2013.01); *H03M 7/3002* (2013.01); *H04L 69/04* (2013.01)

(58) Field of Classification Search

CPC ... G06F 21/6254; H03M 7/3002; H04L 69/04
See application file for complete search history.

(56) References Cited

U.S. PATENT DOCUMENTS

2021/0383197 A1* 12/2021 Da Silva .................. G06N 3/08
2022/0156633 A1* 5/2022 Anwar ................... G06N 20/00
2022/0335269 A1* 10/2022 Zhang ..................... G06N 3/02
2022/0383091 A1* 12/2022 Das ......................... H04L 69/04
2022/0391778 A1* 12/2022 Green .................... G06N 20/20
2023/0082173 A1* 3/2023 Li ........................... G06N 20/00
713/168
2023/0237321 A1* 7/2023 Cirillo ................. G06F 21/6254
706/15
2023/0325652 A1* 10/2023 Balevi ...................... G06N 3/08
706/12
2024/0005215 A1* 1/2024 Ong ....................... G06N 20/20
2024/0028974 A1* 1/2024 Gottin .................... G06N 20/20
2024/0174254 A1* 5/2024 Chen ..................... G06F 18/214

(Continued)

OTHER PUBLICATIONS

Abadi et al., "Deep Learning with Differential Privacy", arXiv:1607.00133v2, Oct. 24, 2016, 14 pages.

(Continued)

*Primary Examiner* — Nam T Tran
(74) *Attorney, Agent, or Firm* — DORITY & MANNING, P.A.

(57) ABSTRACT

New techniques are provided which reduce communication in private federated learning without the need for setting or tuning compression rates. Example on-the-fly methods automatically adjust the compression rate based on the error induced during training, while maintaining provable privacy guarantees through the use of secure aggregation and differential privacy.

20 Claims, 9 Drawing Sheets

(56) References Cited

U.S. PATENT DOCUMENTS

2024/0256973 A1 * 8/2024 Vandikas ............ G06F 21/6254

OTHER PUBLICATIONS

Agarwal et al., "cpSGD: Communication-Efficient and Differentially Private Distributed SDG", arXiv:1805.10559v1, May 27, 2018, 28 pages.
Agarwal et al., "The Skellam Mechanism for Differentially Private Federated Learning", arXiv:2110.04995v2, Oct. 29, 2021, 25 pages.
Aji, "Sparse Communication for Distributed Gradient Descent", arXiv:1704.05021v2, Jul. 24, 2017, 6 pages.
Alistarh et al., "QSGD: Communication-Efficient SGD via Gradient Quantization and Encoding", arXiv:1610.02132v4, Dec. 6, 2017, 28 pages.
Arora et al., "Differentially Private Generalized Linear Models Revisited", arXiv:2205.03014v2, Mar. 6, 2024, 43 pages.
Arora et al., "Faster Rates of Convergence to Stationary Points in Differentially Private Optimization", arXiv:2206.00846v2, May 30, 2023, 42 pages.
Asi et al., "Optimal Algorithms for Mean Estimation Under Local Differential Privacy", arXiv:2205.02466v1, May 5, 2022, 27 pages.
Bassily et al., "Private Empirical Risk Minimization: Efficient Algorithms and Tight Error Bounds", arXiv:1405.7085v2, Oct. 17, 2014, 39 pages.
Bassily et al., "Private Stochastic Convex Optimization with Optimal Rates", arXiv:1908.09970v1, Aug. 27, 2019, 18 pages.
Bell et al., "Secure Single-Server Aggregation with (Poly) Logarithmic Overhead", 2020 Association for Computing Machinery Special Interest Group on Security, Audit, and Control Conference on Computer and Communications Security, Virtual, Nov. 9-13, 2020, 17 pages.
Berrett et al., "Locally Private Non-Asymptotic Testing of Discrete Distributions is Faster Using Interactive Mechanisms", arXiv:2005.12601v1, May 26, 2020, 31 pages.
Biswas et al., "CoinPress: Practical Private Mean and Covariance Estimation", arXiv:2006.06618v2, Oct. 10, 2022, 21 pages.
Bonawitz et al., "Practical Secure Aggregation for Federated Learning on User-Held Data", arXiv:1611.04482v1, Nov. 14, 2016, 5 pages.
Bonawitz, "Practical Secure Aggregation for Federated Learning on User-Held Data", arXiv:1611.04482v1, Nov. 14, 2016, 5 pages.
Bonawitz, "Towards Federated Learning at Scale: System Design", arXiv:1902.01046v2, Mar. 22, 2019, 15 pages.
Bretagnolle et al., "Estimation des Densites: Risque Minimax", Z. Wahrscheinlichkeitstheorie verw Gebiete, vol. 47, Jan. 1979, 19 pages.
Bu et al., "Fast and Memory Efficient Differentially Private-SGD via JL Projections", arXiv:2102.03013v1, Feb. 5, 2021, 17 pages.
Bun et al., "Average-Case Averages: Private Algorithms for Smooth Sensitivity and Mean Estimation", arXiv:1906.02830v1, Jun. 6, 2019, 41 pages.
Charikar et al., "Finding Frequent Items in Data Streams", International Colloquium on Automata, Languages, and Programming, Malaga, Spain, Jul. 8-13, 2002, 11 pages.
Chen et al., "Breaking the Communication-Privacy-Accuracy Trilemma", arXiv:2007.11707v3, Apr. 20, 2021, 35 pages.
Chen et al., "Communication Efficient Federated Learning with Secure Aggregation and Differential Privacy", Neural Information Processing Systems 2021 Workshop Privacy in Machine Learning, Dec. 14, 2021, Virtual, 9 pages.
Chen et al., "LAG: Lazily Aggregated Gradient for Communication-Efficient Distributed Learning", arXiv:1805.09965v2, May 30, 2018, 25 pages.
Chen et al., "The Fundamental Price of Secure Aggregation in Differentially Private Federated Learning", arXiv:2203.03761v1, Mar. 7, 2022, 42 pages.
Chen et al., "The Poisson Binomial Mechanism for Unbiased Federated Learning with Secure Aggregation", Thirty-Nineth International Conference on Machine Learning, Baltimore, Maryland, United States, Jul. 17-23, 2022, 17 pages.
Choquette-Choo et al., "Multi-Epoch Matrix Factorization Mechanisms for Private Machine Learning", arXiv:2211.06530v2, Jun. 8, 2023, 40 pages.
Diakonikolas et al., "Sever: A Robust Meta-Algorithm for Stochastic Optimization", arXiv:1803.02815v2, May 29, 2019, 34 pages.
Duchi et al., "Minimax Optimal Procedures for Locally Private Estimation", arXiv:1604.02390v2, Nov. 14, 2017, 64 pages.
Duchi, "Lecture Notes on Statistics and Information Theory", Dec. 6, 2023, https://stanford.edu/class/stats311/Lectures/full notes.pdf, retrieved on Jun. 25, 2024, 495 pages.
Dwork et al., "Differential Privacy Under Continual Observation", Forty-second Association for Computing Machinery Symposium on Theory of Computing, Cambridge, Massachusetts, United States, Jun. 6-8, 2010, 10 pages.
Dwork et al., "Pan-Private Streaming Algorithms", Pan-Private Streaming Algorithms, Beijing, China, Jan. 5-7, 2010, 32 pages.
Dwork, et al., "The Algorithmic Foundations of Differential Privacy", Foundations and Trends in Theoretical Computer Science, vol. 9, Issue 3-4, Aug. 11, 2014, 281 pages.
Feldman et al., "Lossless Compression of Efficient Private Local Randomizers", arXiv:2102.12099v1, Feb. 24, 2021, 27 pages.
Fowl et al., "Robbing the Fed: Directly Obtaining Private Data in Federated Learning with Modified Models", arXiv:2110.13057v2, Mar. 18, 2022, 25 pages.
Girgis et al., "Shuffled Model of Federated Learning: Privacy, Accuracy and Communication Trade-Offs", arXiv:2008.07180v2, Sep. 23, 2020, 34 pages.
Haddadpour et al., "FedSketch: Communication-Efficient and Private Federated Learning via Sketching", arXiv:2008.04975v1, Aug. 11, 2020, 34 pages.
Hatamizadeh et al., "Do Gradient Inversion Attacks Make Federated Learning Unsafe?", arXiv:2202.06924v3, Jan. 30, 2023, 13 pages.
Ivkin et al., "Communication-Efficient Distributed SGD with Sketching", arXiv:1903.04488v3, Jan. 23, 2020, 19 pages.
Jhunjhunwala et al., "Adaptive Quantization of Model Updates for Communication-Efficient Federated Learning", arXiv:2102.04487v1, Feb. 8, 2021, 10 pages.
Jin et al., "A Short Note on Concentration Inequalities for Random Vectors with Subgaussian Norm", arXiv:1902.03736v1, Feb. 11, 2019, 6 pages.
Kairouz et al., "Practical and Private (Deep) Learning Without Sampling or Shuffling", arXiv:2103.00039v3, Dec. 10, 2021, 37 pages.
Kairouz et al., "The Distributed Discrete Gaussian Mechanism for Federated Learning with Secure Aggregation", arXiv:2102.06387v4, Sep. 8, 2022, 54 pages.
Kamath et al., "A Primer on Private Statistics", arXiv:2005.00010v1, Apr. 30, 2020, 20 pages.
Kamath et al., "Private Mean Estimation of Heavy-Tailed Distributions", arXiv:2002.09464v3, Feb. 16, 2021, 37 pages.
Kane et al., "Sparser Johnson-Lindenstrauss Transforms", arXiv:1012.1577v6, Feb. 5, 2014, 23 pages.
Karwa et al., "Finite Sample Differentially Private Confidence Intervals", arXiv:1711.03908v1, Nov. 10, 2017, 51 pages.
Kasiviswanathan et al., "What Can We Learn Privately?", arXiv:0803.0924v3, Feb. 19, 2010, 35 pages.
Liu et al., "Differential Privacy and Robust Statistics in High Dimensions", arXiv:2111.06578v1, Nov. 12, 2021, 78 pages.
Liu et al., "Robust and Differentially Private Mean Estimation", arXiv:2102.09159v2, Nov. 24, 2021, 58 pages.
Makarenko et al., "Adaptive Compression for Communication-Efficient Distributed Training", arXiv:2211.00188v1, Oct. 31, 2022, 23 pages.
McMahan et al., "Communication-Efficient Learning of Deep Networks from Decentralized Data", arXiv:1602.05629v4, Jan. 26, 2023, 11 pages.
McMahan et al., "Learning Differentially Private Recurrent Language Models", arXiv:1710.06963v3, Feb. 24, 2018, 14 pages.
McMahan et al., "Private Online Prefix Sums via Optimal Matrix Factorizations", arXiv:2202.08312v3, Jan. 18, 2023, 33 pages.

(56) References Cited

OTHER PUBLICATIONS

Micikevicius et al., "Mixed Precision Training", arXiv:1710.03740v3, Feb. 15, 2018, 12 pages.
Mironov, "Renyi Differential Privacy", arXiv:1702.07476v3, Aug. 25, 2017, 13 pages.
Pagh et al., "Improved Utility Analysis of Private CountSketch", arXiv:2205.08397v2, Oct. 12, 2022, 12 pages.
Prasad et al., "Robust Estimation via Robust Gradient Estimation", arXiv:1802.06485v2, Apr. 20, 2018, 48 pages.
Price et al., "(1+ eps)-Approximate Sparse Recovery", arXiv:1110.4414v2, Dec. 26, 2011, 21 pages.
Rothchild et al., "FetchSGD: Communication-Efficient Federated Learning with Sketching", arXiv:2007.07682v2, Oct. 8, 2020, 29 pages.
Shi et al., "Understanding Top-K Sparsification in Distributed Deep Learning", arXiv:1911.08772v1, Nov. 20, 2019, 14 pages.
Steinke et al., "Between Pure and Approximate Differential Privacy", arXiv:1501.06095v1, Jan. 24, 2015, 15 pages.
Stich et al., "Sparsified SGD with Memory", arXiv:1809.07599v2, Nov. 28, 2018, 16 pages.
Suliman et al., "Two Models are Better than One: Federated Learning Is Not Private for Google Gboard Next Word Prediction", arXiv:2210.16947v2, Oct. 9, 2023, 19 pages.
Suresh et al., "Correlated Quantization for Distributed Mean Estimation and Optimization", arXiv:2203.04925v2, Jul. 8, 2022, 30 pages.
Ullah et al., "Private Federated Learning with Autotuned Compression", arXiv:2307.10999v1, Jul. 20, 2023, 56 pages.
Vershynin, "High-Dimensional Probability: An Introduction with Applications in Data Science", Cambridge University Press, Cambridge, United Kingdom, Sep. 27, 2018, 272 pages.
Warner, "Randomized Response: A Survey Technique for Eliminating Evasive Answer Bias", Journal of the American Statistical Association, vol. 60, No. 309, Mar. 1965, 9 pages.
Wen et al., "TernGrad: Ternary Gradients to Reduce Communication in Distributed Deep Learning", arXiv:1705.07878v6, Dec. 29, 2017, 13 pages.
Wikipedia, "Differential Privacy", https://en.wikipedia.org/wiki/Differential_privacy, retrieved on Jun. 24, 2024, 12 pages.
Xu et al., "Federated Learning of Gboard Language Models with Differential Privacy", arXiv:2305.18465v2, Jul. 17, 2023, 15 pages.

* cited by examiner

PRIVATE FEDERATED LEARNING WITH REDUCED COMMUNICATION COST

RELATED APPLICATIONS

This application claims priority to and the benefit of U.S. Provisional Patent Application No. 63/481,752, filed Jan. 26, 2023. U.S. Provisional Patent Application No. 63/481,752 is hereby incorporated by reference in its entirety.

FIELD

The present disclosure is directed to systems and methods for performing mean estimation, such as performing mean estimation in a federated learning framework for training machine learning models. In particular, the present disclosure is directed to adaptive techniques to automatically tune compression rate in private federated learning.

BACKGROUND

Federated learning (FL) is a machine learning setting in which multiple clients (e.g., user devices) participate to train a (typically) machine learning (ML) model orchestrated by a central aggregator (e.g., a server system). An application of this paradigm is developing machine learning services for user devices. There are two main constraints or objectives in FL settings: communication-efficiency and privacy.

Communication efficiency is important since the clients typically communicate to the central aggregator via relatively slow media (such as the Internet), and the trend of moving to larger ML models is increasing the size of messages communicated proportionally. This necessitates the use of compression techniques which reduces the size of messages communicated. To address this, various compression techniques have been proposed; however they all require fixing the compression rate a-priori. Determining a compression rate which leads to an acceptable compression-accuracy tradeoff is non-trivial.

Privacy is also important since clients such as user devices may contain sensitive personal data, and trained models may in some ways reflect this sensitive information. To mitigate this issue, privacy-preserving techniques have been proposed to train machine learning models. Two widely-adopted techniques are Differential Privacy (DP) and Secure Aggregation (SecAgg). DP protects against identification of the presence/absence of a client from the trained model. SecAgg constrains the central aggregator to observing only aggregated client updates, rather than individual updates.

Techniques which provide improved communication efficiency, while preserving privacy, for FL or other distributed mean estimation settings would be welcome in the art.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for federated learning of a global version of a machine learning model with improved communication efficiency. The method can be performed for each of one or more update iterations. The method includes communicating, by a server computing system, a current set of adaptive compression parameters to a plurality of client computing devices. The method includes receiving, by the server computing system, a plurality of first compressed vectors respectively from the plurality of client computing devices, wherein the first compressed vector received from each client computing device has been generated by performance by the client computing device of a compression algorithm to a respective update vector of the client computing device using the current set of adaptive compression parameters. The method includes receiving, by the server computing system, a plurality of second compressed vectors respectively from the plurality of client computing devices, wherein the second compressed vector received from each client computing device has been generated by application by the client computing device of the compression algorithm to the respective update vector of the client computing device using the second set of compression parameters. The method includes performing, by the server computing system, a global update to the global version of the machine learning model based at least in part on a first aggregate of the plurality of first compressed vectors. The method includes determining, by the server computing system, one or more compression error values based at least in part on a second aggregate of the plurality of second compressed vectors. The method includes updating, by the server computing system, the current set of adaptive compression parameters based at least in part on the one or more compression error values.

In some implementations, the current set of adaptive compression parameters has a first compression rate; the second set of adaptive compression parameters has a second compression rate; and the first compression rate is smaller than the second compression rate.

In some implementations, updating, by the server computing system, the current set of adaptive compression parameters based at least in part on the one or more compression error values comprises: when the one or more compression error values indicate compression error greater than a desired compression error: updating, by the server computing system, the current set of adaptive compression parameters so as to decrease a first compression rate associated with the current set of adaptive compression parameters; and when the one or more compression error values indicate compression error less than the desired compression error: updating, by the server computing system, the current set of adaptive compression parameters so as to increase the first compression rate associated with the current set of adaptive compression parameters.

In some implementations, determining, by the server computing system, the one or more compression error values based at least in part on the second aggregate of the plurality of second compressed vectors comprises determining, by the server computing system as the one or more compression error values, a norm of the second aggregate of the plurality of second compressed vectors.

In some implementations, determining, by the server computing system as the one or more compression error values, the norm of the second aggregate of the plurality of second compressed vectors comprises determining, by the server computing system as the one or more compression error values, a differentially private norm of the second aggregate of the plurality of second compressed vectors.

In some implementations, performing, by the server computing system, the global update to the global version of the machine learning model based at least in part on the first aggregate of the plurality of first compressed vectors comprises: decompressing, by the server computing system, the first aggregate of the plurality of first compressed vectors to obtain an estimated mean; and performing, by the server computing system, the global update to the global version of the machine learning model based at least in part on the estimated mean.

In some implementations, determining, by the server computing system, the one or more compression error values based at least in part on the second aggregate of the plurality of second compressed vectors comprises: re-compressing, by the server computing system, the estimated mean according to the second set of compression parameters to obtain a re-compressed aggregate; and determining, by the server computing system as the one or more compression error values, a difference between the re-compressed aggregate and the second aggregate.

In some implementations, the first aggregate of the plurality of first compressed vectors comprises a differentially private aggregate of the plurality of first compressed vectors.

In some implementations, the first aggregate of the plurality of first compressed vectors comprises a Secure Aggregation (SecAgg) aggregate of the plurality of first compressed vectors.

In some implementations, the current set of adaptive compression parameters comprise one or more sketch sizes for one or more sketching operations. In some implementations, the plurality of first compressed vectors comprise sketched vectors generated by application of the one or more sketching operations.

In some implementations, the second set of compression parameters is fixed for the update iterations. In some implementations, the second set of compression parameters is transmitted by the server to the client computing devices only in a first iteration. In other implementations, the second set of compression parameters adapts at each iteration and is transmitted by the server to the client computing devices at each iteration.

In some implementations, the respective update vector of each client computing device describes updates to model parameters of a local version of the machine learning model stored at the client computing device that result from training the local version of the machine learning model on local training data stored at the client computing device.

In some implementations, the one or more update iterations comprise a plurality of update iterations. In some implementations, the one or more update iterations comprise second or subsequent iterations.

Another example aspect is directed to a computer-implemented method for distributed mean estimation with improved communication efficiency. The method can be performed for each of one or more update iterations. The method comprises communicating, by a server computing system, a current set of adaptive compression parameters to a plurality of client computing devices. The method comprises receiving, by the server computing system, a plurality of first compressed vectors respectively from the plurality of client computing devices, wherein the first compressed vector received from each client computing device has been generated by performance by the client computing device of a compression algorithm to a respective data vector of the client computing device using the current set of adaptive compression parameters. The method comprises receiving, by the server computing system, a plurality of second compressed vectors respectively from the plurality of client computing devices, wherein the second compressed vector received from each client computing device has been generated by application by the client computing device of the compression algorithm to the respective data vector of the client computing device using the second set of compression parameters. The method comprises determining, by the server computing system, a estimated mean of the data vectors of the client computing devices based at least in part on a first aggregate of the plurality of first compressed vectors. The method comprises determining, by the server computing system, one or more compression error values based at least in part on a second aggregate of the plurality of second compressed vectors. The method comprises updating, by the server computing system, the current set of adaptive compression parameters based at least in part on the one or more compression error values.

Another example aspect is directed to a server computing system configured to perform any of the methods described herein.

Another example aspect is directed to a client computing device configured to perform operations. The operations can be performed for each of one or more update iterations. The operations include receiving, from a server computing system, a current set of adaptive compression parameters. The operations include training a local version of a machine learning model on local training data stored at the client computing device to generate an update vector that describes updates to model parameters of the local version of the machine learning model stored at the client computing device. The operations include applying a compression algorithm to the update vector using the current set of adaptive compression parameters to generate a first compressed vector. The operations include applying the compression algorithm to the update vector using a second set of compression parameters to generate a second compressed vector. The operations include transmitting the first compressed vector and the second compressed vector to the server computing system.

In some implementations, at each update iteration, the current set of adaptive compression parameters has been updated based on one or more compression error values generated based at least in part on the second compressed vector transmitted by the client computing device at the prior update iteration.

In some implementations, the current set of adaptive compression parameters has a first compression rate; the second set of adaptive compression parameters has a second compression rate; and the first compression rate is smaller than the second compression rate.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
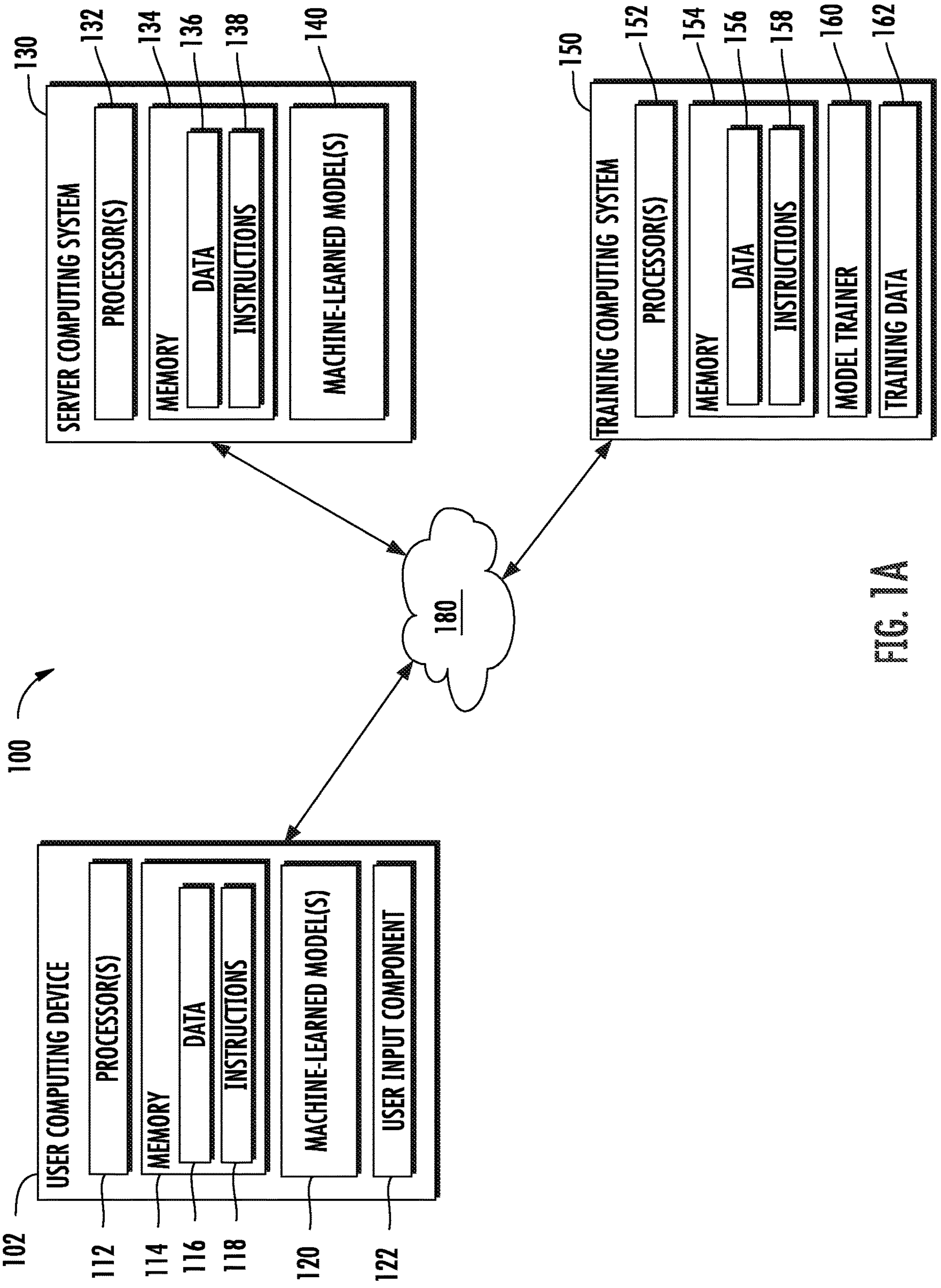
FIG. 1A depicts a block diagram of an example computing system that performs federated learning according to example embodiments of the present disclosure.

Reference numerals that are repeated across plural figures are intended to identify the same features in various implementations.

DETAILED DESCRIPTION

Overview

Example implementations of the present disclosure represent new techniques for reducing communication in federated learning (FL) without the need for setting or tuning compression rates. In particular, the present disclosure provides techniques that solve the problem of designing adaptive (e.g., "self-tuning") compression methods in private FL. Example implementations described herein can be performed on-the-fly to automatically adjust the compression rate based on the error induced during training, while maintaining provable privacy guarantees through the use of secure aggregation and differential privacy. The techniques are provably instance-optimal for mean estimation, meaning that they can adapt to the "hardness of the problem" with minimal interactivity. One common principle behind the proposed techniques is to set compression rate such that the compression error doesn't overwhelm the privacy error. These approaches enable high compression rates with acceptable sacrifice in accuracy. The effectiveness of these approaches has been demonstrated on real-world datasets, achieving near-ideal compression rates without the need for tuning.

The systems and methods of the present disclosure provide a number of technical effects and benefits. As one example, the proposed techniques provide improved communication efficiency, while preserving privacy, for FL or other distributed mean estimation settings. By providing such improved communication efficiency, consumption of computational resources can be reduced. For example, consumption of memory, processor cycles, and/or network bandwidth can be reduced. These computational benefits can be achieved all while preserving user privacy.

Examples of embodiments and implementations of the systems and methods of the present disclosure are discussed in the following sections.

Example Implementations of Private Federated Learning with Autotuned Compression

Example Preliminaries

An algorithm A satisfies $(\varepsilon, \delta)$-differential privacy if for all datasets D and D' differing in one data point and all events E in the range of the algorithm, $\mathbb{P}(A(D)\in E)\leq e^{\varepsilon}\mathbb{P}\,P(A(D')\in E)+\delta$.

Secure Aggregation (SecAgg): SecAgg is a cryptographic technique that can be used by multiple parties to compute an aggregate value, such as a sum or average, without revealing individual contributions by each party to the computation.

Count-mean sketching: In one embodiment, a compression technique based on the sparse Johnson-Lindenstrauss (JL) random matrix/count-mean sketch data structure can be used. The sketching operation can be a linear map, denoted as S: $\mathbb{R}^{d}\rightarrow\mathbb{R}^{PC}$, where P, C$\in\mathbb{N}$ are parameters. The corresponding unsketching operation is denoted as U: $\mathbb{R}^{PC}\rightarrow\mathbb{R}^{d}$. In some embodiments, a count-sketch data structure can be used. A count-sketch can be linear map, which for j$\in$[P], is denoted as $S_j$: $\mathbb{R}^{d}\rightarrow\mathbb{R}^{C}$. The count-sketch can be described using two hash functions: bucketing hash $h_j$: [d]$\rightarrow$[C] and sign hash: $s_j$: [d]$\rightarrow\{-1,1\}$, mapping the q-th coordinate $z_q$ to $$\sum_{i=1}^{d} s_j(i)\mathbb{1}(h_j(i)=h_j(q))z_i.$$

The count-mean sketch construction pads P count sketches to get S: $\mathbb{R}^{d}\rightarrow\mathbb{R}^{PC}$, mapping z as follows, $$S(z)=\left(1/\sqrt{P}\right)\left[S_1^T \;\; S_2^T \;\; \cdots \;\; S_P^T\right]^T z.$$

The above, being a JL matrix, approximately preserves norms of z i.e. $\|S(z)\|\sim\|z\|$, which is useful in controlling sensitivity, thus enabling application of DP techniques. The unsketching operation is simply $U(S(z))=S^TS(z)$. This gives an unbiased estimate, $\mathbb{E}[S^TS(z)]=z$, whose variance scales as $d\|z\|^2/(PC)$. This captures the trade-off between compression rate, d/PC, and error.

Example Instance-Optimal Federated Mean Estimation (FME)

A central operation in standard federated learning (FL) algorithms is averaging the client model updates in a distributed manner. This can be posed as a standard distributed mean estimation (DME) problem with n clients, each with a vector $z_i\in\mathbb{R}^{d}$ sampled i.i.d. from an unknown distribution D with population mean $\mu$. The goal of the server is to estimate $\mu$ while communicating only a small number of bits with the clients at each round. Once a communication-efficient scheme is determined, the communication-efficient scheme can be readily integrated into the learning algorithm of choice, such as FedAvg.

In some embodiments, in order to provide privacy and security of the clients' data, mean estimation for FL has additional requirements. For example, in some embodiments, clients can only be accessed via SecAgg and DP must be satisfied. This particular approach can be referred to as Federated Mean Estimation (FME). To bound the sensitivity of the empirical mean, $$\hat{\mu}(\{z_i\}_{i=1}^{n}) := (1/n)\sum_{i=1}^{n} z_i,$$

the data is assumed to be bounded by $\|z_i\| \leq G$. Since gradient norm clipping is almost always used in the DP FL setting, G can be assumed to be known. The first result characterizing the communication cost of FME can be an unbiased estimator based on count-mean sketching that satisfy (ε, δ)-differential privacy and (order) optimal error of $$\mathbb{E}\left[\|\overline{\mu} - \mu\|^2\right] = \tilde{\Theta}\left(G^2\left(\frac{d}{n^2\varepsilon^2} + \frac{1}{n}\right)\right), \quad (1)$$

with an (order) optimal communication complexity of $\tilde{O}(n^2\varepsilon^2)$. The error rate in Equation 1 is optimal as it matches the information theoretic lower bound that holds even without any communication constraints. The communication cost of $\tilde{O}(n^2\varepsilon^2)$ cannot be improved for the worst-case data as it matches the lower bound.

Example Adapting to the Instance's Norm

Example embodiments of the present disclosure illustrate that, with a sketch size of O(PC) that costs O(PC) in per client communication, the following can be achieved:

$$\mathbb{E}\left[\|\overline{\mu} - \mu\|^2\right] = \tilde{O}\left(G^2\left(\frac{d\left(M^2 + \frac{1}{n}\right)}{PC} + \frac{d}{n^2\varepsilon^2} + \frac{1}{n}\right)\right), \quad (2)$$

where the normalized norm of the mean, $$M = \frac{\mu}{G} = \frac{\mathbb{E}[z]}{G} \epsilon [0, 1]$$

and G is the maximum $\|z\|$ as chosen for a sensitivity bound under DP FL. The first error term can capture how the sketching error scales as the norm of the mean, MG. When M is significantly smaller than one, as motivated by the application to FL, a significantly smaller choice of the communication cost, $PC = O(\min n^2\varepsilon^2, ndM^2 + 1/n)$, is sufficient to achieve the optimal error rate of Equation 1. The dominant term is smaller than the standard sketch size of $PC = O(n^2\varepsilon^2)$ by a factor of $M^2 \in [0,1]$. However, selecting this sketch size requires knowledge of M. This necessitates a scheme that adapts to the current instance by privately estimating M with a small communication cost. Example aspects of the present disclosure therefore include an interactive Adapt Norm FME algorithm.

The FME algorithm can be instance-optimal with respect to M if it achieves the optimal error rate of Equation 1 with communication complexity of $0(M^2n^2\varepsilon^2)$ for every instance whose norm of the mean is bounded by GM. Aspects of the present invention can include a novel adaptive compression scheme and instance optimality.

Example Instance-optimal FME for Norm M

In some embodiments, a two-round procedure that achieves the optimal error in Equation 1 with instance-optimal communication complexity of $$O\left(\min\left(d, \frac{M^2n^2\varepsilon^2}{\log\left(\frac{1}{\delta}\right)}, M^2nd\right)\right)$$

can be utilized, without prior knowledge of M. In one particular aspect, count-mean sketch can be used in the first round, to construct a private yet accurate estimate of M. This can be enabled by the fact the count-mean sketch approximately preserves norms. In the second round, the sketch size can be set based on the estimate of M. Such interactivity is (i) provably necessary for instance-optimal FME and (ii) needed in other problems that target instance-optimal bounds with DP.

In some embodiments, each client computes a sketch, clips it, and sends it to the server. Each client sends two sketches. The second sketch is used for estimating the statistic to ensure that instance-optimal compression-utility tradeoffs can be achieved. Although only one sketch is needed for the Adapt Norm approach, since the statistic can be directly estimated from the (first) sketch S without a second sketch, allowing for additional minor communication optimization, the use of the two-sketch approach allows the result to be inline with the Adapt Tail approach which requires both sketches.

Algorithm 1 Adapt Norm FME

Input: Sketch sizes $C_1$, P $\tilde{C}$, $\tilde{P}$, noise variance $\tilde{\sigma}$, σ, $\overline{\gamma}$, client data $\{z_c\}_c$ 1: for j = 1 to 2 do 2: Select $n$ random clients $\{z_c^{(j)}\}_{c=1}^{n}$ and broadcast sketching operators $S_j$ and $\tilde{S}$ of sizes ($C_j$, P) and ($\tilde{C}$, $\tilde{P}$), respectively.

3: $SecAgg$: $v_j = SecAgg\left(\{\tilde{Q}_j^{(c)}\}_{c=1}^{n}\right) + \mathcal{N}\left(0, \frac{\sigma^2}{n}\mathbb{I}_{PC}\right)$, $\tilde{v}_j = SecAgg\left(\{\tilde{Q}_j^{(c)}\}_{c=1}^{n}\right)$, where $Q_j^{(c)} \leftarrow \text{clip}_B\left(S_j\left(z_c^{(j)}\right)\right)$, $\tilde{Q}_j^{(c)} \leftarrow \text{clip}_B\left(\tilde{S}_j^{(i)}\left(z_c^{(j)}\right)\right)$ 4: Unsketch DP mean: Compute $\overline{\mu}_j = U_j(v_j)$ 5: Estimate DP norm: $\hat{n}_j = \text{clip}_B(\|\overline{v}_j\|) + \text{Laplace}(\tilde{\sigma})$ 6: $C_{j+1} = \max\left(\left\lceil \min\left(\frac{n^2\epsilon^2}{\log(1/\delta)}, nd\right)\frac{(\hat{n}_j + \overline{\gamma})^2}{G^2P}, 2\right)$ 7: end for In some embodiments, the server protocol aggregates the sketches using SecAgg. In the first round, $Q_j$'s are not used, i.e., $C_1=0$. Only $\tilde{Q}_j$'s are used to construct a private estimate of the norm of the mean $\hat{n}_1$ (line 5). There is no need to unsketch $\tilde{Q}_j$'s as the norm is preserved under the sketching operation. This estimate can be used to set the next round's sketch size, $C_{j+1}$, so as to ensure the compression error of the same order as privacy and statistical error; this is the same choice made when it was assumed oracle knowledge of M. In the second round and onwards, the first sketch can be used, which is aggregated using SecAgg and privatized by adding appropriately scaled Gaussian noise. Finally, the $Q_j$'s are unsketched to estimate the mean. In some embodiments, the clients need not send $\tilde{Q}_j$'s after the first round.

Example Theoretical Analysis

The Adapt Norm approach can achieve instance-optimality with respect to M; an optimal error rate of Equation 1 can be achieved for every instance of the problem with an efficient communication complexity of $O(M^2n^2\varepsilon^2)$ The optimality follows from a matching lower bound. interactivity can beis critical in achieving instance-optimality. This follows from a lower bound that proves a fundamental gap between interactive and non-interactive algorithms.

For any choice of the failure probability $$0 < \beta < \min\left(\frac{\log\frac{1}{\delta}}{n^2\varepsilon^2}, 1\right), \text{ with } B = 2G, C_1 = 0, P = \tilde{P} = \left[\Theta\left(\log\left(\frac{4}{\beta}\right)\right)\right], \tilde{C} = 2, \sigma^2 = \frac{256B^2\log\left(\frac{1}{\delta}\right)}{\varepsilon^2}, \tilde{\sigma} = \frac{4B}{n\varepsilon} \text{ and } \overline{\gamma} = \frac{2B\log\left(\frac{8}{\beta}\right)}{n\varepsilon} + \frac{B\sqrt{\log\left(\frac{16}{\beta}\right)}}{\sqrt{n}}$$

satisfies $(\varepsilon, \delta)$-DP, the output $\overline{\mu}_2$ is an unbiased estimate of mean, and its error is bounded as, $$\mathbb{E}\left[\|\overline{\mu} - \mu\|^2\right] \le O\left(G^2\left(\frac{d\log\left(\frac{1}{\delta}\right)}{n^2\varepsilon^2} + \frac{1}{n}\right)\right).$$

Finally, in some embodiments, the number of rounds is two, and with probability at least $1-\beta$, the total per-client communication complexity is $\tilde{O}(\min$ $$\left(\frac{n^2\varepsilon^2}{\log\left(\frac{1}{\delta}\right)}, nd\right)\left(M^2 + \frac{1}{n^2\varepsilon^2} + \frac{1}{n}\right).$$

The error rate matches Equation 1. Compared to the target communication complexity of $O((M^2+1/n)n^2\varepsilon^2)$, the above communication complexity has an additional term $1/(n\varepsilon)^2$, which stems from the fact that the norm can only be accessed privately. In the interesting regime where the error is strictly less than the trivial $M^2G^2$, the extra $1/(n\varepsilon)^2+1/n$ is smaller than $M^2$. The resulting communication complexity is $O(M^2n^2\varepsilon^2/\log 1/\delta)$. This nearly matches the oracle communication complexity that has the knowledge of M.

In some embodiments, a key feature of the algorithm is interactivity: the norm of the mean estimated in the prior round is used to determine the sketch size in the next round. In some embodiments, at least two rounds of communication are necessary for any algorithm with instance-optimal communication complexity.

Example Adapting to the Instance's Tail-Norm

In some embodiments, a key aspect in norm-adaptive compression can be interactivity. On top of interactivity, another key aspect of tail-norm-adaptive compression can be count median-of-means sketching.

Count Median-of-means Sketching

In some embodiments, the sketching technique takes $R \in \mathbb{N}$ independent count-mean sketches. Let $S^{(i)}: \mathbb{R}^d \to \mathbb{R}^{PC}$ denote the i-th count-mean sketch. The sketching operation, $S: \mathbb{R}^d \to \mathbb{R}^{R \times PC}$, is defined as the concatenation:

$$S(z) = Sz = \left[\left(S^{(1)}z\right)^T\left(S^{(2)}z\right)^T \ldots \left(S^{(R)}z\right)^T\right]^T.$$

An example median-of-means unsketching takes the median over R unsketched estimates:

$$U(S(z))_j = \text{Median}\left(\left\{\left(S^{(i)\,T}S^{(i)}z\right)_j\right\}_{i=1}^{R}\right).$$

This median trick boosts the confidence to get a high probability of success (as opposed to a guarantee in expectation) and to get tail-norm (as opposed to norm) based bounds. However, in non-private settings, it suffices to take multiple copies of a count-sketch, which can correspond to setting P=1. On the other hand, setting P>1 can obtain bounded sensitivity, which is useful for DP, yielding one proposed count-median-of-means sketching technique.

Algorithm 2 Adapt Tail FME

Input: Sketch sizes R, $C_1$, P, $\tilde{R}$, $\tilde{C}$, $\tilde{P}$, noise $\sigma$, $\tilde{\sigma}$, $\{k_j\}_j$, $\{\overline{\gamma}_j\}_j$, rounds K, client data $\{z_c\}_c$ for j = 1 to K do Select $n$ random clients $\left\{z_c^{(j)}\right\}_{c=1}^{n}$ and broadast sketching operators $S_j$ and $\overline{S}_j$ of sizes (R, $C_j$, P) and ($\tilde{R}$,$\tilde{C}$, $\tilde{P}$) respectively ..

$SecAgg$: $v_j = SecAgg\left(\left\{Q_j^{(c)}\right\}_{c=1}^{n}\right) + \mathcal{N}\left(0, \frac{\sigma^2}{n}\mathbb{I}_{PC}\right)$, $\tilde{v}_j = SecAgg\left(\{\tilde{Q}_j^{(c)}\}_{c=1}^{n}\right)$, where $Q_j^{(c)} \leftarrow \left[\text{clip}_B\left(S_j^{(i)}\left(z_c^{(j)}\right)\right)\right]_{i=1}^{R}$, $\tilde{Q}_j^{(c)} \leftarrow \left[\text{clip}_B\left(\tilde{S}_j^{(i)}\left(z_c^{(j)}\right)\right)\right]_{i=1}^{\overline{R}}$ Unsketch DP mean: Compute $\overline{\mu}_j = \text{Top}_{k_j}(U_j(v_j))$ Estimated error: $\overline{e}_j = \left\|\tilde{S}_j\left(\overline{\mu}_j\right) - \tilde{v}_j\right\|$ $\tilde{\gamma}_j = \overline{\gamma}_j + \text{Laplace}(\tilde{\sigma}) = \tilde{e}_j = \overline{e}_j + \text{Laplace}(2\tilde{\sigma})$ If $\tilde{e}_j \le \tilde{\gamma}_j$, set $\overline{\mu} = \overline{\mu}_j$, break $C_{j+1} = 2C_j$ end for

Approximately-sparse Setting

In some embodiments, improved guarantees can be achieved when $\mu$ is approximately sparse. This is captured by the tail-norm. Given $z \in \mathbb{R}^d$, $\|z\| \le G$, and $k \in [d]$, the normalized tail-norm is $$\|z_{n-tail(k)}\|_2 := \frac{1}{G}\min_{\tilde{z}:\ \|\tilde{z}\|_0 \le k}\|z - \tilde{z}\|_2.$$

This measures the error in the best k-sparse approximation. The mean estimate via count median-of-means sketch is still unbiased and for $C = \Omega Pk$, has error bounded as, $$\|\overline{\mu} - \mu_2^2\| = O\left(\frac{dG^2}{PC}\left(\|\mu_{n-tail(k)}\|^2 + \frac{1}{n}\right) + \frac{G^2}{n} + \frac{G^2 d}{n^2\varepsilon^2}\right) \tag{4}$$

If all tail-norms are known, then the sketch size can be set as $$PC = \min_k \max\left(k, \min(nd, n^2\varepsilon^2)\left(\|\mu_{n-tail(k)}\|^2 + \frac{1}{n}\right)\right)$$

and achieve the error rate in Equation 1. When k=0, this recovers the previous communication complexity of count-mean sketch. For optimal choice of k, this communication complexity can be smaller.

Instance-optimal FME for Tail-norm

In some embodiments, multiple tail norms are used. To obtain the multiple tail norms, a doubling-trick based scheme can be used. Starting from an optimistic guess of the sketch size, the guess is progressively doubled , until an appropriate stopping criterion on the error is met. A challenge is in estimating the error of the first sketch S (for the current choice of sketch size), as naively this would require the uncompressed true vector z to be sent to the server. To this end, the second sketch $\tilde{S}$ can be used to obtain a reasonable estimate of this error, while using significantly less communication than transmitting the original z.

The unsketched estimate can be re-sketched, U(S(z)), of z with $\tilde{S}$. The re-sketch can now be compared with the second sketch $\tilde{S}(z)$ to get an estimate of the error: $\|\tilde{S}(U(S(z)))-\tilde{S}(z)\|^2 = \widetilde{\|S} S(U(S(z))-z)\|^2 \approx \|U(S(z)))-z\|^2$, which uses the linearity and norm-preservation property of the count-sketch.

The client protocol can remain the same; each participating client sends two independent (count median-of-mean) sketches to the server. The server, starting from an optimistic choice of initial sketch size $PC_1$, obtains the aggregated sketches from the clients via SecAgg and adds noise to the first sketch for DP. It then unsketches the first sketch to get an estimate of mean, $\overline{\mu}_j$). In some embodiments, $Top_{k_j}$ is not applied (i.e., $k_j$=d) for the upcoming result $\overline{\mu}_j$ can then be sketched with the second sketch $\tilde{S}$ and the norm of difference with the aggregated second sketch from clients can be determined, giving an estimate of the error of $\overline{\mu}_j$. Finally, if the error is sufficiently small, dictated by the threshold $\overline{\gamma}_j$, which will be set as target error in Equation 1, the process is stop. To preserve privacy at this step, a threshold algorithm can be used, which adds noise to both the error and threshold and stops if the noisy error is smaller than the noisy threshold. If this criterion is not met, the first sketch size is doubled and the process is repeated.

Example Federated Optimization/Learning

One example algorithm is as follows:

Algorithm 3 Adapt Norm FL

Input: Sketch sizes $L_1 = RPC_1$ and $\tilde{L} = \tilde{R}\tilde{P}\tilde{C}$ noise multiplier σ, model dimension d, adaptation method adapt, a constant $c_0$, clipping threshold B, rounds K.

1: for j = 1 to K do

2: Sample n clients; broadcast current model and sketching operators $S_j$, $\tilde{S}j$ of sizes $Lj = RPC_j$ and $\tilde{L}$.

3: $SecAgg: v_j = SecAgg(\{Q_j^{(c)}\}_{c=1}^n) + \mathcal{N}\left(0, \frac{\sigma^2 B^2}{0.9n}\mathbb{I}_{PC}\right)$, $\tilde{v}_j = SecAgg\left(\{\tilde{Q}_j^{(c)}\}_{c=1}^n\right)$, where $Q_j^{(c)} \leftarrow \left[\text{clip}_B\left(S_j^{(i)}\left(z_c^{(j)}\right)\right)\right]_{i=1}^R$, $\tilde{Q}_j^{(c)} \leftarrow \left[\text{clip}_B\left(\tilde{S}_j^{(i)}\left(z_c^{(j)}\right)\right)\right]_{i=1}^{\overline{R}}$ 4: Unsketch DP mean: $\overline{\mu}_j = U_j(v_j)$ 5: Second sketch: $\overline{n}_j = \|\overline{v}_j\|$ 6: $\overline{\gamma}^2 = 20\sigma^2$, $\tilde{\sigma} = \sigma/\sqrt{0.1}$ 7: $\hat{n}_j = \text{clip}_B(\overline{n}_j) + N(0, \tilde{\sigma}^2 B^2)$ 8: $C_{j+1} = \frac{c_0(\hat{n}_j + \overline{\gamma})^2}{B^2 P\sigma^2}$ 9: end for In some embodiments, procedures for FME require multiple rounds of communication. While this can be achieved in FO by freezing the model for the interactive FME rounds, it is undesirable in a real-world application of FL as it would increase the total wall-clock time of the training process. Therefore, in some embodiments, an additional heuristic for the Adapt Norm and Adapt Tail algorithms can be added when used in FO/FL: to use a stale estimate of the privately estimated statistic using the second sketch.

Two Stage Method (e.g., Algorithm 4)

First, a single fixed compression can be used. It can be assumed that the norm of the updates remains relatively stable throughout training. To estimate it, W warm-up rounds can be run as the first stage. Then, using this estimate, a fixed compression rate can be used, by balancing the errors incurred due to compression and privacy, akin to Adapt Norm in FME, which can then be used for the second stage. Because the first stage is run without compression, it is important that W is minimized, which may be possible through prior knowledge of the statistic, e.g., proxy data distributions or other hyperparameter tuning runs.

Algorithm 4 Two Stage FL

Input: Sketch size $L_1 = RPC_1$ and $\tilde{L} = \tilde{R}\tilde{P}\tilde{C}$ noise multiplier σ, model dimension d, adaptation method adapt, a constant $c_0$, clipping threshold B, rounds K.

1: for j = 1 to W do

2: $SecAgg: v_j = SecAgg\left(\{\tilde{Q}_j^{(c)}\}_{c=1}^n\right) + \mathcal{N}\left(0, \frac{\sigma^2 B^2}{0.9n}\mathbb{I}_{PC}\right)$, where $Q_j^{(c)} \leftarrow \left[\text{clip}_B\left(S_j^{(i)}\left(z_c^{(j)}\right)\right)\right]_{i=1}^R$ 3: $\overline{n}_j = \left\|SecAgg\left(\{Q_j^{(c)}\}_{c=1}^n\right)\right\|$ 4: Unsketch DP mean: $\overline{\mu}_j = U_j(v_j)$ 5: $\hat{n}_j = \text{clip}_B(\overline{n}_j) + N(0, \sigma^2 B^2/0.1)$ 6: end for 7: $\hat{n} = \frac{1}{W}\sum_{j=1}^W \hat{n}_j$, $C = \frac{c_0\left(\hat{n} + \sqrt{20}\,\sigma\right)^2}{B^2 P\sigma^2}$ -continued

Algorithm 4 Two Stage FL

8: for j = W + 1 to K do
9: Select n random clients and broadcast current model and sketching operator $S_j$ of size L = RPC.
10: Receive $\{Q_j^{(c)}\}_{c=1}^{n}$ from clients.
11: $$v_j = SecAgg\left(\{Q_j^{(c)}\}_{c=1}^{n}\right) + N\left(0, \frac{\sigma^2 B^2}{n}\mathbb{I}_{PC}\right),$$
12: Unsketch DP mean: $\bar{\mu}_j = U_j(v_j)$
13: end for

Adapt Norm (e.g., Algorithm 3)

In some embodiments, an algorithm at every round uses two sketches: one to estimate the mean for FL and the other to compute an estimate of its norm, which is used to set the (first) sketch size for the next round. This is akin to the corresponding FME with the exception that it uses stale estimate of norm, from the prior round, to set the sketch size in the current round. Further, in some embodiments, the privacy budget between the mean and norm estimation parts can be split heuristically in the ratio 9:1, and set sketch size parameters $\tilde{R}=1$, $R=P=\tilde{P}=[\log d]$. Finally, the constant $c_0$ is set such that the total error in FME, at every round, is at most 1.1 times the DP error.

In some embodiments, the Laplace noise added to norm can be replaced by Gaussian noise for ease of privacy accounting in practice.

Example Devices and Systems

FIG. 1A depicts a block diagram of an example computing system 100 that performs federated learning according to example embodiments of the present disclosure. The system 100 includes a plurality of client computing devices (e.g., client computing device A 102A, client computing device B (not pictured) . . . , client computing device N 102N), a server computing system 130, and a training computing system 150 that are communicatively coupled over a network 180.

The client computing devices 102A, 102N can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing devices 102A, 102N include one or more processors 112A, 112N and a memory 114A, 114N. The one or more processors 112A, 112N can be any suitable processing device (e.g., a processor core, a microprocessor, an ASIC, an FPGA, a controller, a microcontroller, etc.) and can be one processor or a plurality of processors that are operatively connected. The memory 114A, 114N can include one or more non-transitory computer-readable storage media, such as RAM, ROM, EEPROM, EPROM, flash memory devices, magnetic disks, etc., and combinations thereof. The memory 114A, 114N can store data 116A, 116N and instructions 118A, 118N which are executed by the processors 112A, 112N to cause the client computing devices 102A, 102N to perform operations.

In some implementations, the client computing devices 102A, 102N can store or include one or more machine-learned models 120A, 120N. The one or more machine-learned models 120A, 120N can be local machine-learned models 121A, 121N that are stored locally on the client computing devices 102A, 102N and are processing some data that is stored locally on the client computing devices 102A, 102N. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120A, 120N can be received from the server computing system 130 over network 180, stored in the client computing device memory 114A, 114N, and then used or otherwise implemented by the one or more processors 112A, 112N. In some implementations, the client computing devices 102A, 102N can implement multiple parallel instances of a single machine-learned model 120A, 120N (e.g., to perform parallel classification across multiple instances of input).

Additionally, or alternatively, one or more machine-learned models 140 can be included in or otherwise stored and implemented by the server computing system 130 that communicates with the client computing device 102 according to a client-server relationship. In some instances, the one or more machine-learned models 140 can include a global model 145 having a plurality of parameters. For example, the machine-learned models 140 can be implemented by the server computing system 130 as a portion of a web service (e.g., an image classification service). Thus, one or more models 120 can be stored and implemented at the client computing device 102 and/or one or more models 140 can be stored and implemented at the server computing system 130.

The client computing devices 102A, 102N can also include one or more user input components 122A, 122N that receives user input. The user input component 122A can receive user input from a first user, and the user component 122N can receive user input from another user. For example, the user input component 122A, 122N can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

In some instances, the computing devices/systems 102A, 102N, 130 can train the machine-learned models 120A, 120N and/or 140 stored at the client computing devices 102A, 102N and/or 140 using various training or learning techniques, such as, for example, backwards propagation of errors. For example, a loss function can be back propagated through the model(s) to determine updates to one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The computing devices/systems 102, 130 can perform a number of generalization techniques (e.g., weight decays, dropouts, etc.) to improve the generalization capability of the models being trained.

In particular, the client computing device 102A, 102N can include training data 162A, 162N such as a local training dataset including a plurality of training examples. The training examples can be used in the federated learning approach described herein to train the models 120A, 120N, 140.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model (s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a re-clustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the client computing devices 102A, 102N can include the training dataset 162A, 162N. In such implementations, the models 120A, 120N can be both trained and used locally at the client computing device 102A, 102N. In some of such implementations, the client computing device 102A, 102N can personalize the models 120A, 120N based on user-specific data that is stored locally.

Figure 1B:
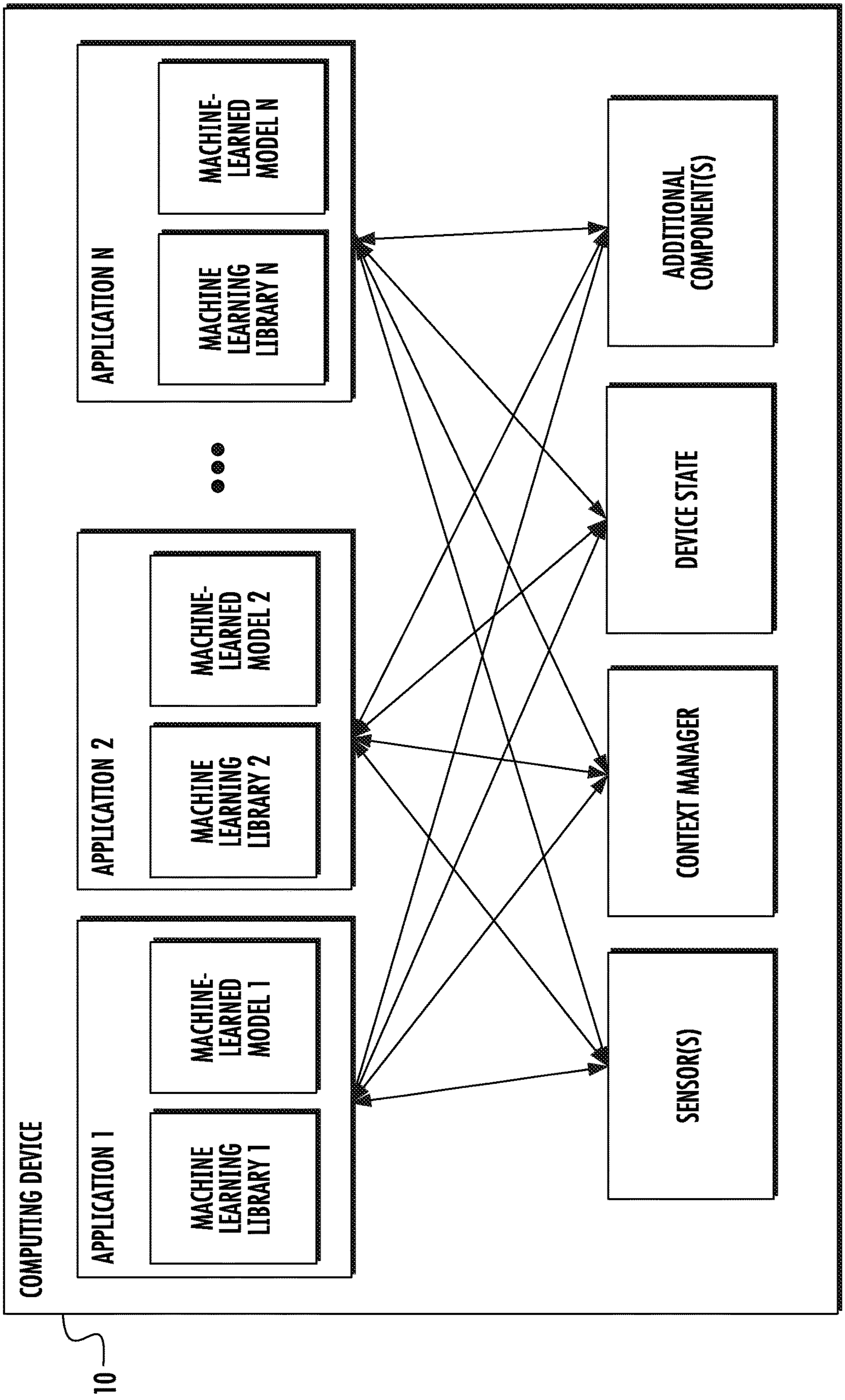
FIG. 1B depicts a block diagram of an example computing device that performs federated learning according to example embodiments of the present disclosure.

FIG. 1B depicts a block diagram of an example computing device 10 that performs according to example embodiments of the present disclosure. The computing device 10 can be a client computing device 102A, 102N or a server computing device 130 in FIG. 1A.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
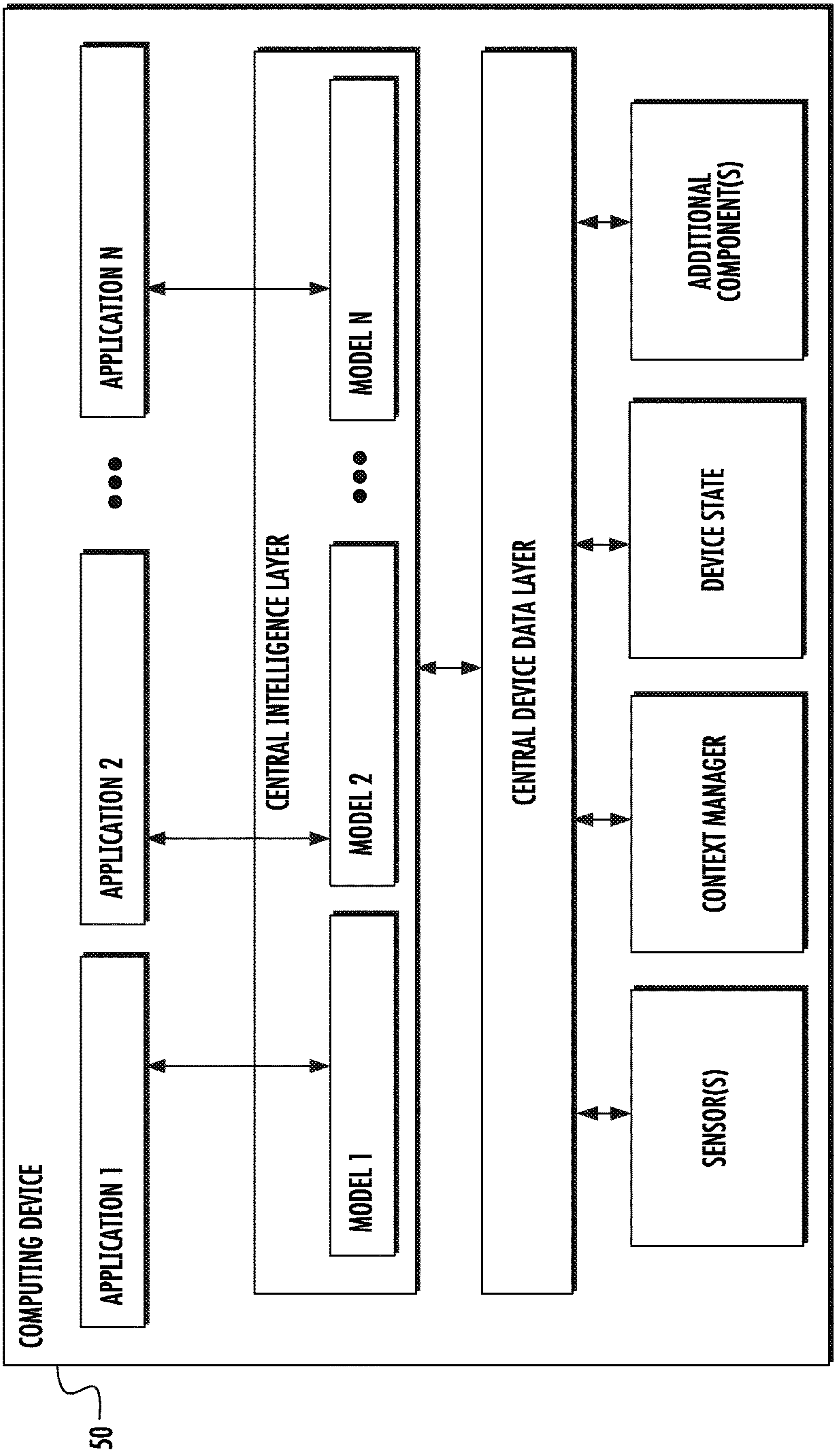
FIG. 1C depicts a block diagram of an example computing device that performs federated learning according to example embodiments of the present disclosure.

FIG. 1C depicts a block diagram of an example computing device 50 that performs according to example embodiments of the present disclosure. The computing device 50 can be a client computing devices 102A, 102N or a server computing device 130 in FIG. 1A.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
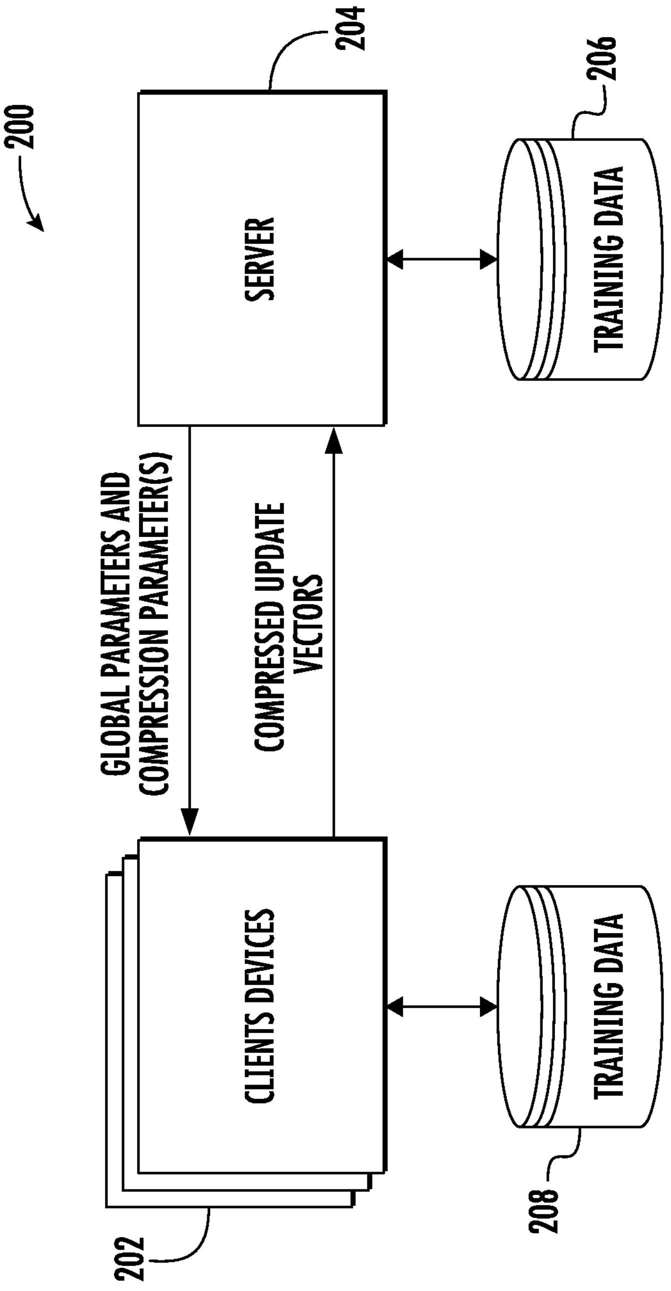
FIG. 2 depicts a block diagram of a system for training one or more global machine learning models using respective training data stored locally on a plurality of client devices according to example embodiments of the present disclosure.

FIG. 2 depicts an example system 200 for training one or more global machine learning models 206 using respective training data 208 stored locally on a plurality of client devices 202. The one or more global machine learning models 206 can include the global model 145 in FIG. 1A. The plurality of client devices 202 can include client computing device 102A and client computing device 102N. System 200 can include a server device 204 (e.g., server computing system 130). The server device 204 can be configured to access machine learning model 206, and to provide compression parameter(s) to a plurality of client devices 202. Model 206 can be, for instance, a classifier model, a linear regression model, logistic regression model, a support vector machine model, a neural network (e.g., convolutional neural network, recurrent neural network, etc.), or other suitable model. In some implementations, server 204 can be configured to communicate with client devices 202 over one or more networks.

Client devices 202 can each be configured to determine update vectors descriptive of updates to one or more trainable parameters associated with model 206 by training the model 206 on training data 208. For instance, training data 208 can be data that is respectively stored locally on the client devices 202. The training data 208 can include audio files, image files, video files, a typing history, location history, and/or various other suitable data. In some implementations, the training data can be any data derived through a user interaction with a client device 202.

The client devices 202 can compress the update vectors using the compression parameter(s) to generated compressed vectors. The client devices 202 can transmit the compressed vectors to the server 204.

Once the server 204 has received the compressed vectors to one or more trainable parameters from the client devices 202, the server 204 can aggregate (e.g., federated averaging, Secure Aggregation, etc.) the updates. For example, the server 204 can aggregate the compressed vectors and then de-compress the aggregate (or vice versa, depending on the compression algorithm used. Subsequently, the server 204 can modify one or more parameters of the model 206 based on the decompressed aggregate of the compressed update vectors.

Further to the descriptions above, a user may be provided with controls allowing the user to make an election as to both if and when systems, programs or features described herein may enable collection, storage, and/or use of user information (e.g., training data 208), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although training data 208 is illustrated in FIG. 2 as a single database, the training data 208 consists of data that is respectively stored at each device 202. Thus, in some implementations, the training data 208 is highly unbalanced and not independent and identically distributed.

Client devices 202 can be configured to provide the local updates (e.g., update vectors in compressed form) to server 204. As indicated above, training data 208 may be privacy sensitive. According to techniques described herein, the local updates can be performed and provided to server 204 without compromising the privacy of training data 208. For instance, in such implementations, training data 208 is not provided to server 204. The local updates do not include training data 208. In some implementations one or more encryption techniques, random noise techniques (e.g., differential privacy techniques), and/or other security techniques can be added to the training process to obscure any inferable information.

As indicated above, server 204 can receive each local update (e.g., update vectors in compressed form) from client device 202, and can aggregate the local updates to determine a global update to the model 206. In some implementations, server 204 can determine an average (e.g., a weighted average) of the local updates and determine the global update based at least in part on the average.

In some implementations, updated parameters are provided to the server 204 by a plurality of client devices 202, and the respective updated parameters are summed across the plurality of client devices 202. The sum for each of the updated parameters may then be divided by a corresponding sum of weights for each parameter as provided by the clients to form a set of weighted average updated parameters. In some implementations, updated parameters are provided to the server 204 by a plurality of client devices 202, and the respective updated parameters scaled by their respective weights are summed across the plurality of clients to provide a set of weighted average updated parameters. In some examples, the weights may be correlated to a number of local training iterations or epochs so that more extensively trained updates contribute in a greater amount to the updated parameter version. In some examples, the weights may include a bitmask encoding observed entities in each training round (e.g., a bitmask may correspond to the indices of embeddings and/or negative samples provided to a client).

In some implementations, satisfactory convergence of the machine-learned models can be obtained without updating every parameter with each training iteration. In some examples, each training iteration includes computing updates for a target set of trainable parameters.

In some implementations, scaling or other techniques can be applied to the local updates to determine the global update. For instance, a local step size can be applied for each client device 202, the aggregation can be performed proportionally to various data partition sizes of client devices 202, and/or one or more scaling factors can be applied to the local and/or aggregated updates. It will be appreciated that various other techniques can be applied without deviating from the scope of the present disclosure.

The update vectors may include information indicative of the updated trainable parameters. The update vectors may include the locally updated trainable parameters (e.g., the updated parameters or a difference between the updated parameter and the previous parameter received from the server 204). In some examples, the update vectors may include an update term, a corresponding weight, and/or a corresponding learning rate, and the server may determine therewith an updated version of the corresponding trainable parameter. Communications between the server 204 and the client devices 204 can be encrypted or otherwise rendered private.

In general, the client devices 202 may compute local updates to trainable parameters periodically or continually. The server may also compute global updates based on the provided client updates periodically or continually. In some implementations, the learning of trainable parameters includes an online or continuous machine-learning algorithm. For instance, some implementations may continuously update trainable parameters within the global model.

Example Methods

Figure 3:
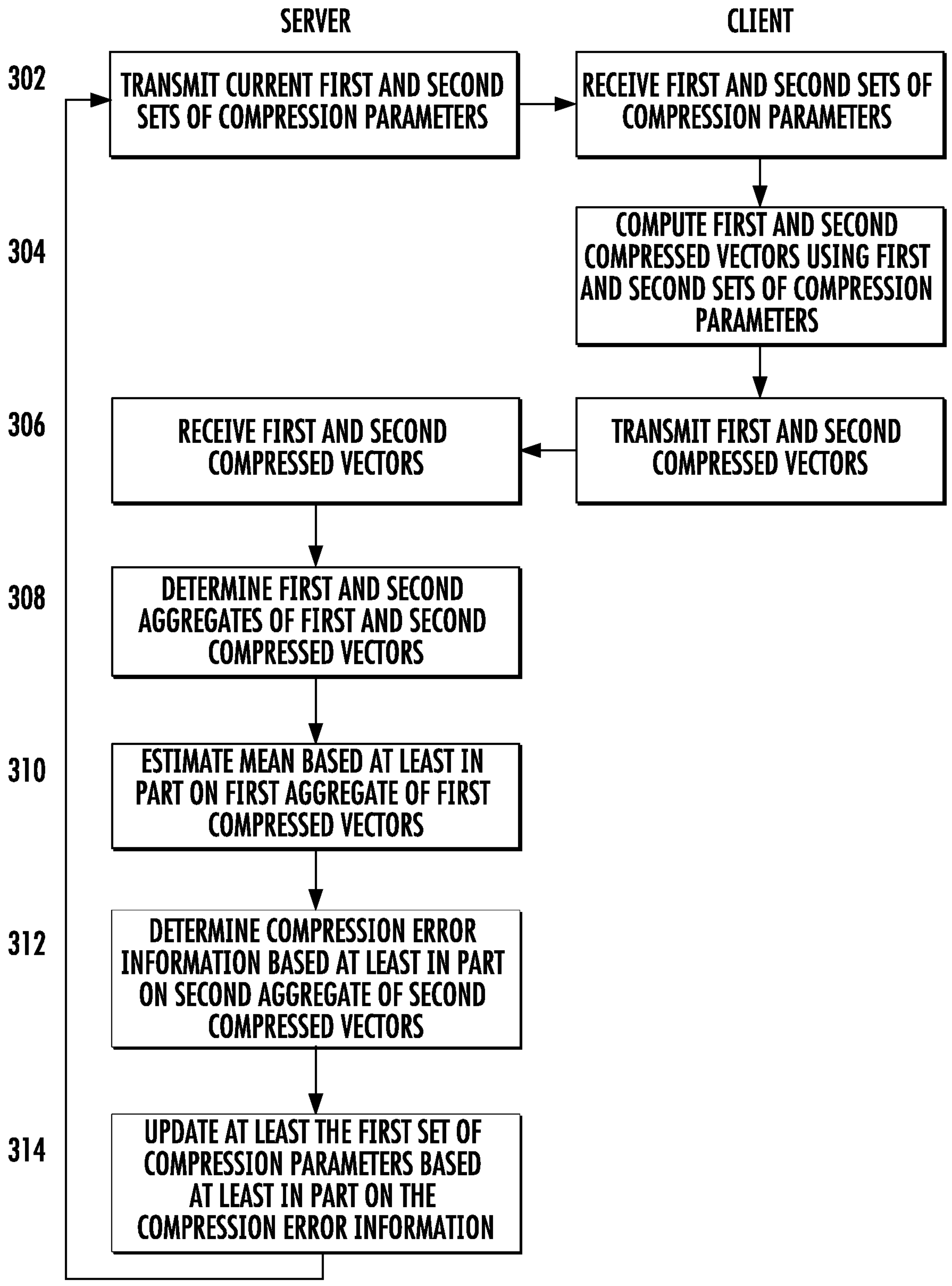
FIG. 3 depicts a swim-lane style flow diagram of an example method of performing private federated learning with reduced communication cost according to example embodiments of the present disclosure.

FIG. 3 depicts a swim-lane style flow diagram of an example method of performing private federated learning with reduced communication cost according to example embodiments of the present disclosure. At 302, a server computing device ("server") can transmit current first and second sets of compression parameters to a client computing device ("client"). At 302, the client can receive the first and second sets of compression parameters. At 304, the client can compute first and second compressed vectors using the first and second sets of compression parameters. At 306, the client can transmit the first and second compressed vectors. At 306, the server can receive the first and second compressed vectors. At 308, the server can determine first and second aggregates of the first and second compressed vectors. At 310, the server can estimate a mean based at least in part on the first aggregate of the first compressed vectors. At 312, the server can determine compression error information based at least in part on the second aggregate of the second compressed vectors. At 314, the sever can update at least the first set of compression parameters based at least in part on the compression error information. After 314, the method can return to 302.

Figure 4:
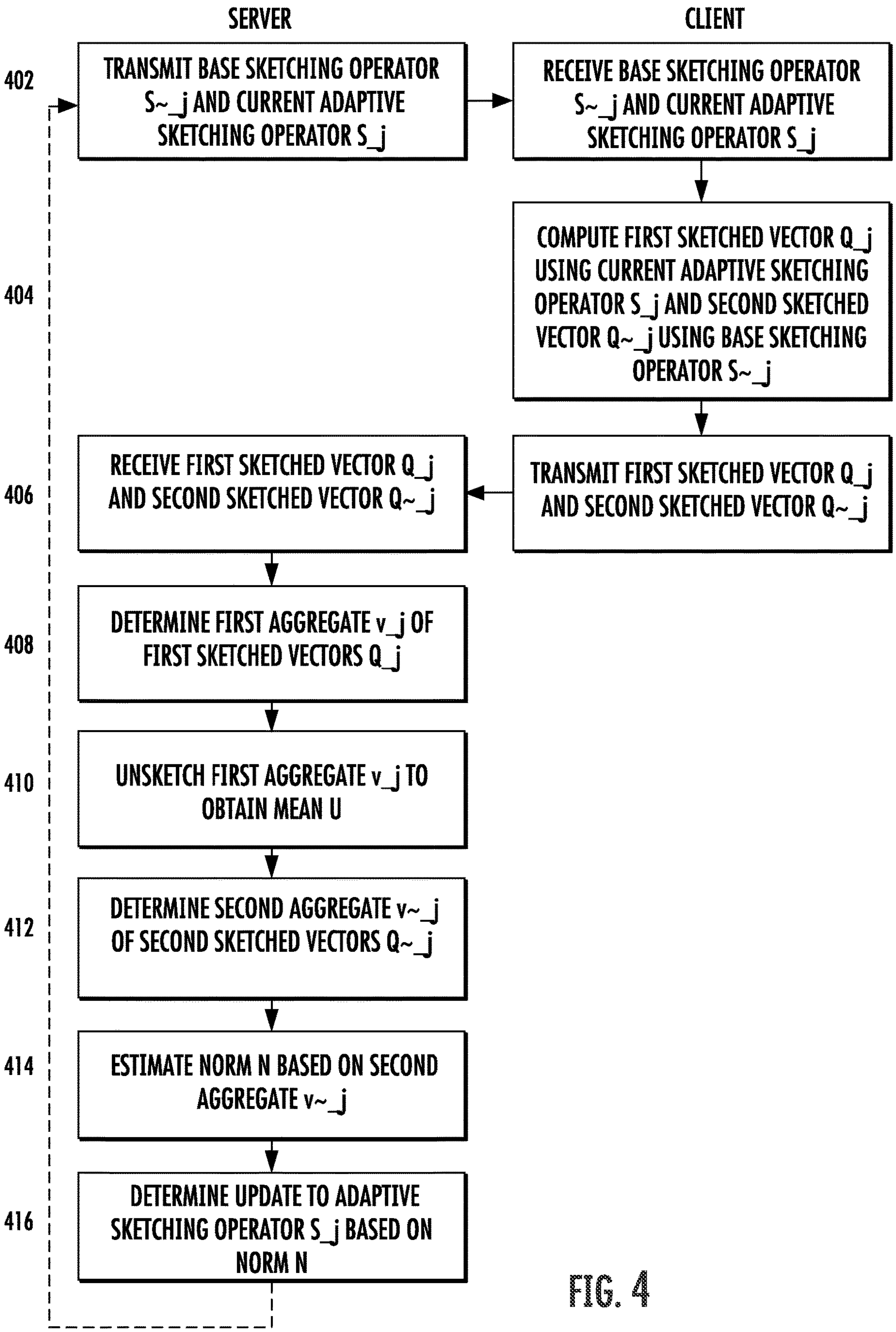
FIG. 4 depicts a swim-lane style flow diagram of an example method of performing private federated learning with reduced communication cost according to example embodiments of the present disclosure.

FIG. 4 depicts a swim-lane style flow diagram of an example method of performing private federated learning with reduced communication cost according to example embodiments of the present disclosure. At 402, a server can transmit a base sketching operator S~_j and current adaptive sketching operators S_j. Also at 402, the client can receive the base sketching operator S~_j and current adaptive sketching operators S_j.

At 404, the client can compute a first sketched vector Q_j using the current adaptive sketching operators S_j and a second sketched vector Q~_j using base sketching operators S~_j. At 406, the client can transmit the first sketched vector Q_j and the second sketched vector Q~_j. At 406, the server can receive the first sketched vector Q_j and the second sketched vector Q~_j. At 408, the server can determine a first aggregate v_j of the first sketched vectors Q_j.

At 410, the server can unsketch the first aggregate v_j to obtain a mean u. At 412, the server can determine a second aggregate v~_j of the second sketched vectors Q~_j. At 414, the server can estimate a norm N based on the second aggregate v~_j. At 416, the server can determine an update to adaptive sketching operators S_j based on the norm N. In some implementations, after 416, the method can return to 402.

Figure 5A:
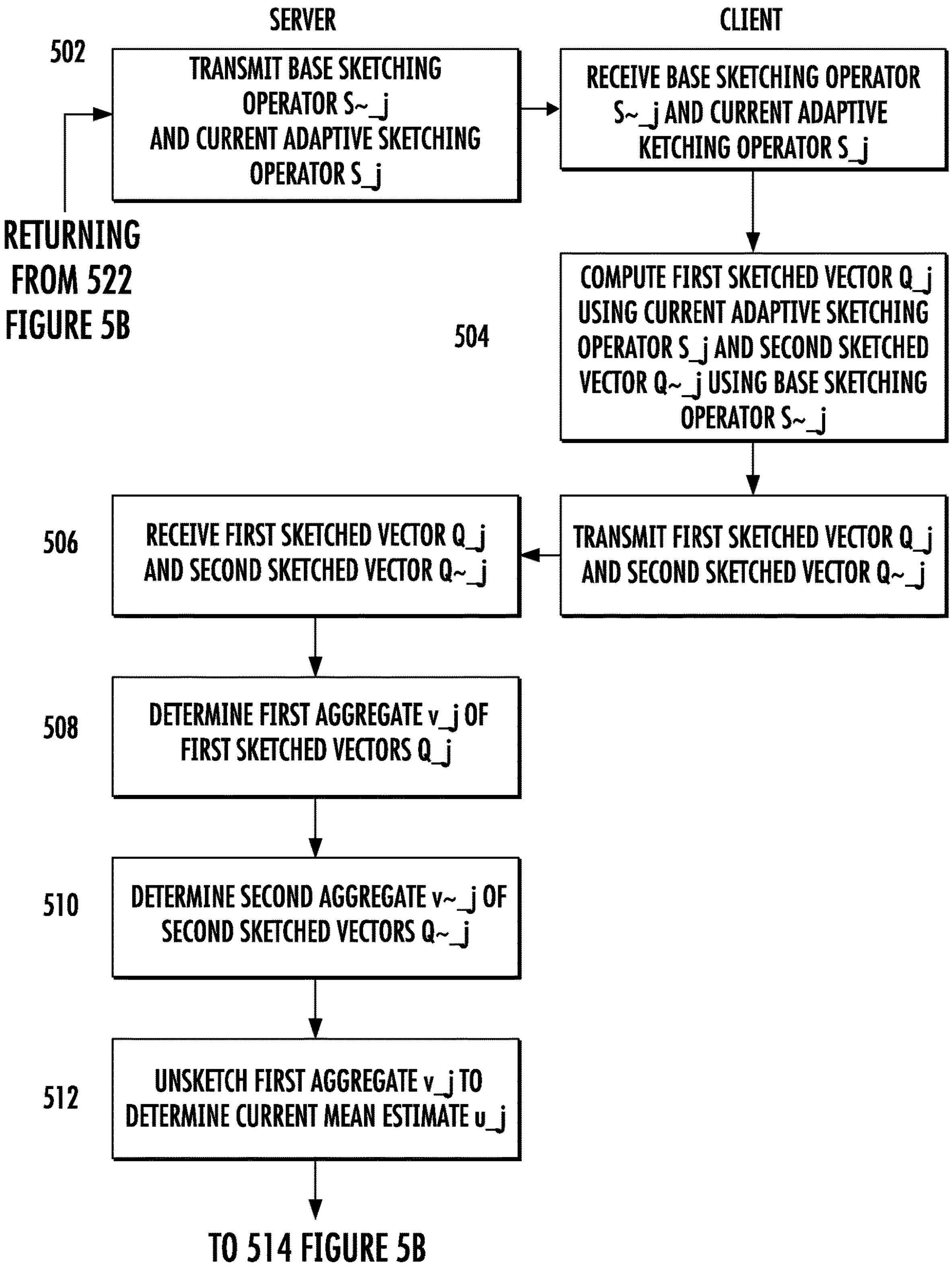
FIGS. 5A-B depict a swim-lane style flow diagram of an example method of performing private federated learning with reduced communication cost according to example embodiments of the present disclosure.
Figure 5B:
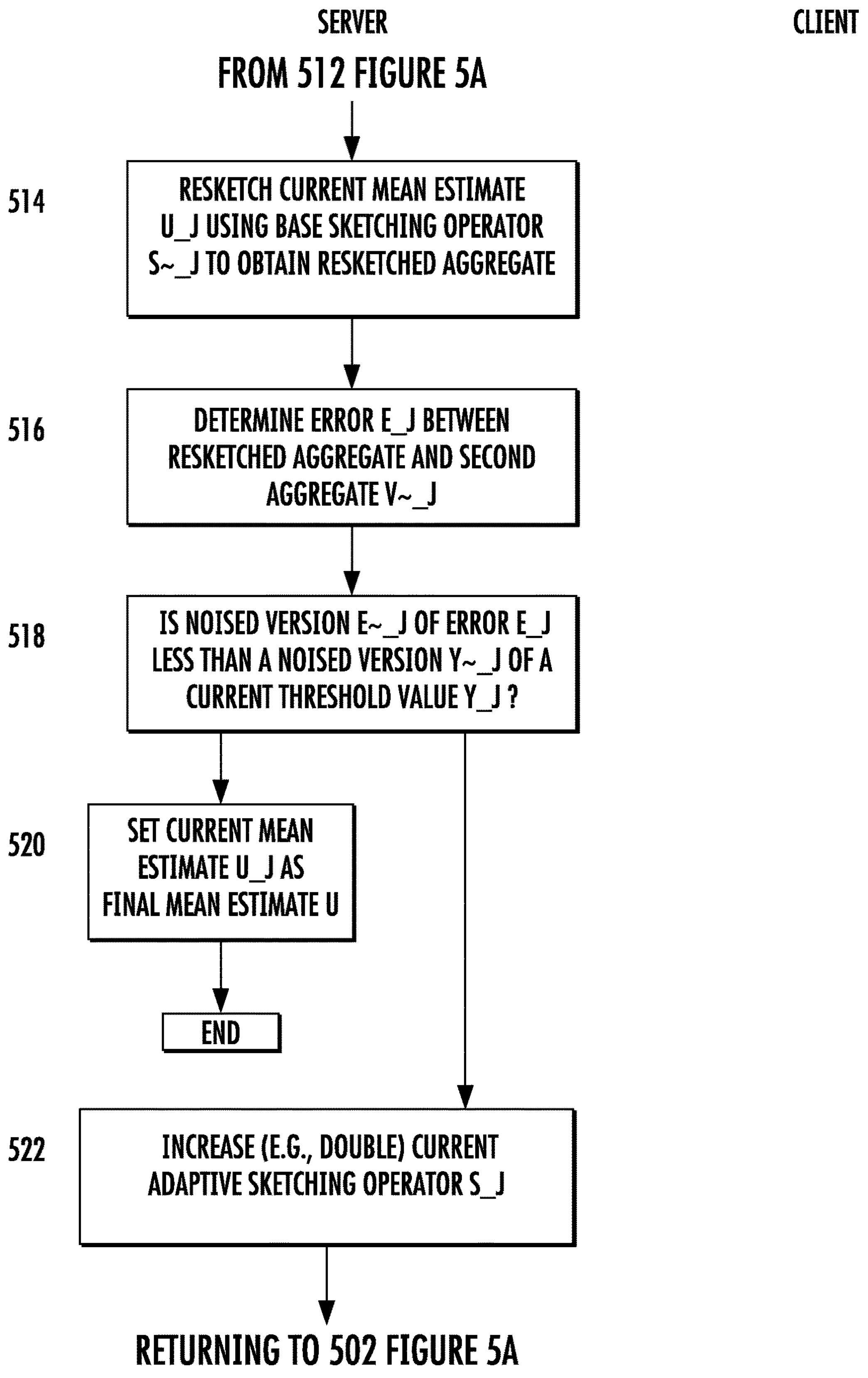

FIGS. 5A-B depict a swim-lane style flow diagram of an example method of performing private federated learning with reduced communication cost according to example embodiments of the present disclosure. Referring first to FIG. 5A, at 502, a server can transmit a base sketching operator S~_j and current adaptive sketching operators S_j. Also at 502, the client can receive the base sketching operator S~_j and current adaptive sketching operators S_j.

At 504, the client can compute a first sketched vector Q_j using the current adaptive sketching operators S_j and a second sketched vector Q~_j using base sketching operators S~_j. At 506, the client can transmit the first sketched vector Q_j and the second sketched vector Q~_j. At 506, the server can receive the first sketched vector Q_j and the second sketched vector Q~_j. At 508, the server can determine a first aggregate v_j of the first sketched vectors Q_j. At 510, the server can determine a second aggregate v~_j of the second sketched vectors Q~_j. At 512, the server can unsketch the first aggregate v_j to determine a current mean estimate u_j.

Referring now to FIG. 5B, at 514, the server can resketch the current mean estimate u_j using the base sketching operator S~_j to obtain a resketched aggregate. At 516, the server can determine an error e_j between the resketched aggregate and the second aggregate v~_j. At 518, the server can determine whether a noised version e~_j of the error e_j is less than a noised version y~_j of a current threshold value γ_j.

If the noised version e~_j of the error e_j is less than a noised version y~_j of a current threshold value γ_j, then the method can proceed to 520 and set the current mean estimate u_j as a final mean estimate u. The method can then end.

However, if noised version e~_j of the error e_j is greater than a noised version γ~_j of a current threshold value γ_j, then the method can proceed to 522 and increase (e.g., double) the current adaptive sketching operators S_j. After 522, method 500 can return to 502.

Figure 6:
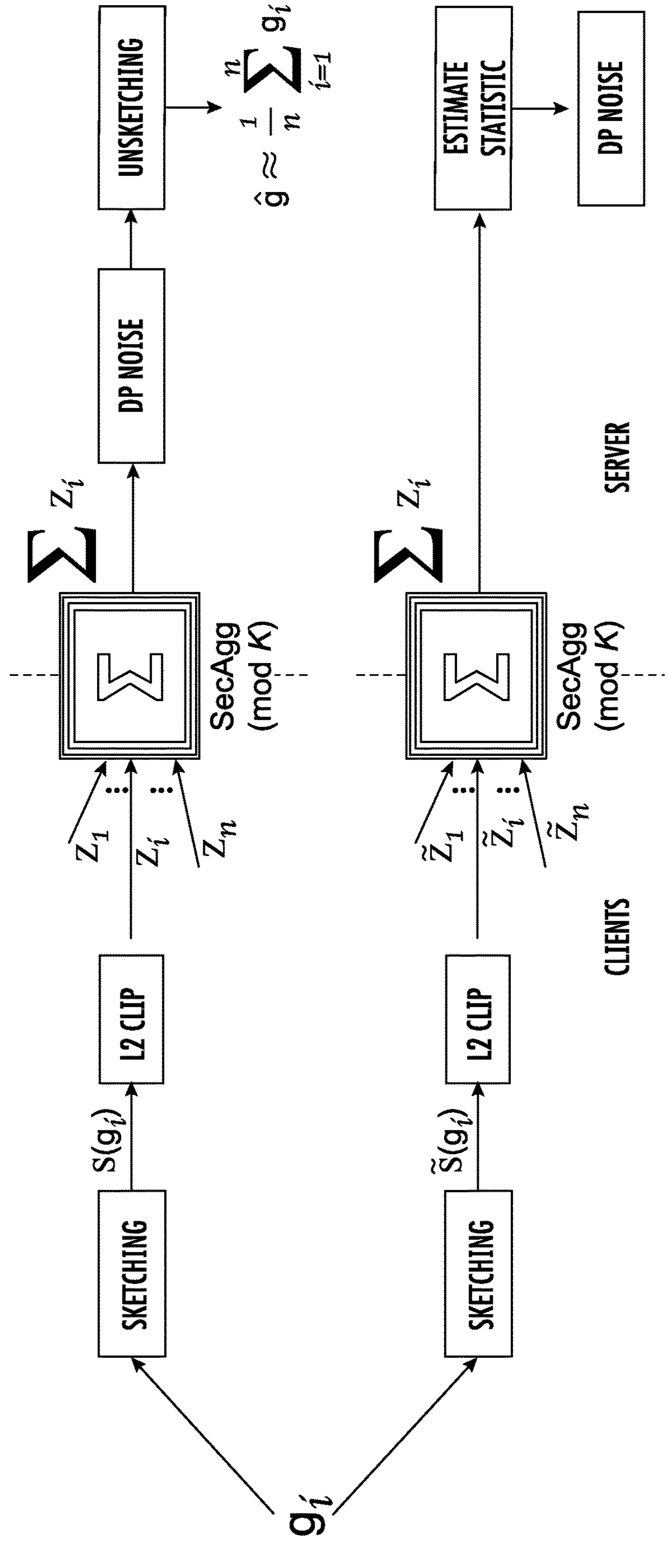
FIG. 6 depicts a graphical representation of a single round of protocol for an example method of performing private federated learning with reduced communication cost according to example embodiments of the present disclosure.

FIG. 6 depicts a graphical representation of a single round of protocol for an example method of performing private federated learning with reduced communication cost according to example embodiments of the present disclosure.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for federated learning of a global version of a machine learning model with improved communication efficiency, the method comprising:

for each of one or more update iterations:

communicating, by a server computing system, a current set of adaptive compression parameters to a plurality of client computing devices;

receiving, by the server computing system, a plurality of first compressed vectors respectively from the plurality of client computing devices, wherein the first compressed vector received from each client computing device has been generated by performance by the client computing device of a compression algorithm to a respective update vector of the client computing device using the current set of adaptive compression parameters;

receiving, by the server computing system, a plurality of second compressed vectors respectively from the plurality of client computing devices, wherein the second compressed vector received from each client computing device has been generated by application by the client computing device of the compression algorithm to the respective update vector of the client computing device using a second set of compression parameters;

training, by the server computing system, the global version of the machine learning model based at least in part on a first aggregate of the plurality of first compressed vectors;

determining, by the server computing system, one or more compression error values based at least in part on a second aggregate of the plurality of second compressed vectors; and updating, by the server computing system, the current set of adaptive compression parameters based at least in part on the one or more compression error values.

2. The computer-implemented method of claim 1, wherein:

the current set of adaptive compression parameters has a first compression rate;

the second set of compression parameters has a second compression rate; and the first compression rate is smaller than the second compression rate.

3. The computer-implemented method of claim 1, wherein updating, by the server computing system, the current set of adaptive compression parameters based at least in part on the one or more compression error values comprises:

when the one or more compression error values indicate compression error greater than a desired compression error: updating, by the server computing system, the current set of adaptive compression parameters so as to decrease a first compression rate associated with the current set of adaptive compression parameters; and when the one or more compression error values indicate compression error less than the desired compression error: updating, by the server computing system, the current set of adaptive compression parameters so as to increase the first compression rate associated with the current set of adaptive compression parameters.

4. The computer-implemented method of claim 1, wherein determining, by the server computing system, the one or more compression error values based at least in part on the second aggregate of the plurality of second compressed vectors comprises determining, by the server computing system as the one or more compression error values, a norm of the second aggregate of the plurality of second compressed vectors.

5. The computer-implemented method of claim 4, wherein determining, by the server computing system as the one or more compression error values, the norm of the second aggregate of the plurality of second compressed vectors comprises determining, by the server computing system as the one or more compression error values, a differentially private norm of the second aggregate of the plurality of second compressed vectors.

6. The computer-implemented method of claim 1, comprising:

decompressing, by the server computing system, the first aggregate of the plurality of first compressed vectors to obtain an estimated mean; and performing, by the server computing system, a global update to the global version of the machine learning model based at least in part on the estimated mean.

7. The computer-implemented method of claim 6, wherein determining, by the server computing system, the one or more compression error values based at least in part on the second aggregate of the plurality of second compressed vectors comprises:

re-compressing, by the server computing system, the estimated mean according to the second set of compression parameters to obtain a re-compressed aggregate; and determining, by the server computing system as the one or more compression error values, a difference between the re-compressed aggregate and the second aggregate.

8. The computer-implemented method of claim 1, wherein the first aggregate of the plurality of first compressed vectors comprises a differentially private aggregate of the plurality of first compressed vectors.

9. The computer-implemented method of claim 1, wherein the first aggregate of the plurality of first compressed vectors comprises a Secure Aggregation (SecAgg) aggregate of the plurality of first compressed vectors.

10. The computer-implemented method of claim 1, wherein the current set of adaptive compression parameters comprise one or more sketch sizes for one or more sketching operations, and wherein the plurality of first compressed vectors comprise sketched vectors generated by application of the one or more sketching operations.

11. The computer-implemented method of claim 1, wherein the second set of compression parameters is fixed for the update iterations.

12. The computer-implemented method of claim 1, wherein the respective update vector of each client computing device describes updates to model parameters of a local version of the machine learning model stored at the client computing device that result from training the local version of the machine learning model on local training data stored at the client computing device.

13. The computer-implemented method of claim 1, wherein the one or more update iterations comprise a plurality of update iterations.

14. A computing system comprising:

one or more processors; and one or more non-transitory computer-readable media storing instructions executable by the one or more processors to perform operations comprising:

communicating a current set of adaptive compression parameters to a plurality of client computing devices;

receiving a plurality of first compressed vectors respectively from the plurality of client computing devices, wherein the first compressed vector received from each client computing device has been generated by performance by the client computing device of a compression algorithm to a respective update vector of the client computing device using the current set of adaptive compression parameters;

receiving a plurality of second compressed vectors respectively from the plurality of client computing devices, wherein the second compressed vector received from each client computing device has been generated by application by the client computing device of the compression algorithm to the respective update vector of the client computing device using a second set of compression parameters;

training a global version of a machine learning model based at least in part on a first aggregate of the plurality of first compressed vectors;

determining one or more compression error values based at least in part on a second aggregate of the plurality of second compressed vectors; and updating the current set of adaptive compression parameters based at least in part on the one or more compression error values.

15. The computing system of claim 14, wherein the respective update vector of each client computing device describes updates to model parameters of a local version of the machine learning model stored at the client computing device that result from training the local version of the machine learning model on local training data stored at the client computing device.

16. The computing system of claim 14, wherein:

the current set of adaptive compression parameters has a first compression rate;

the second set of compression parameters has a second compression rate; and the first compression rate is smaller than the second compression rate.

17. The computing system of claim 14, wherein updating, the current set of adaptive compression parameters based at least in part on the one or more compression error values comprises:

when the one or more compression error values indicate compression error greater than a desired compression error: updating the current set of adaptive compression parameters so as to decrease a first compression rate associated with the current set of adaptive compression parameters; and when the one or more compression error values indicate compression error less than the desired compression error: updating the current set of adaptive compression parameters so as to increase the first compression rate associated with the current set of adaptive compression parameters.

18. The computing system of claim 14, the operations comprising:

decompressing, by the server computing system, the first aggregate of the plurality of first compressed vectors to obtain an estimated mean; and performing, by the server computing system, a global update to the global version of the machine learning model based at least in part on the estimated mean.

19. The computing system of claim 18, wherein determining, by the server computing system, the one or more compression error values based at least in part on the second aggregate of the plurality of second compressed vectors comprises:

re-compressing, by the server computing system, the estimated mean according to the second set of compression parameters to obtain a re-compressed aggregate; and determining, by the server computing system as the one or more compression error values, a difference between the re-compressed aggregate and the second aggregate.

20. One or more non-transitory computer-readable media storing instructions executable by one or more processors to perform operations comprising:

communicating a current set of adaptive compression parameters to a plurality of client computing devices;

receiving a plurality of first compressed vectors respectively from the plurality of client computing devices, wherein the first compressed vector received from each client computing device has been generated by performance by the client computing device of a compression algorithm to a respective update vector of the client computing device using the current set of adaptive compression parameters;

receiving a plurality of second compressed vectors respectively from the plurality of client computing devices, wherein the second compressed vector received from each client computing device has been generated by application by the client computing device of the compression algorithm to the respective update vector of the client computing device using a second set of compression parameters;

training the global version of the machine learning model based at least in part on a first aggregate of the plurality of first compressed vectors;

determining one or more compression error values based at least in part on a second aggregate of the plurality of second compressed vectors; and updating the current set of adaptive compression parameters based at least in part on the one or more compression error values.

* * * * *